United States Patent
Garner et al.

(10) Patent No.: US 6,969,754 B2
(45) Date of Patent: Nov. 29, 2005

(54) BLOCKED ISOCYANATE CROSSLINKER SOLUTION

(75) Inventors: Archie W. Garner, Ham Lake, MN (US); Larry B. Brandenburger, Circle Pines, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 72 days.

(21) Appl. No.: 10/733,589

(22) Filed: Dec. 11, 2003

(65) Prior Publication Data

US 2005/0131193 A1 Jun. 16, 2005

(51) Int. Cl.⁷ .............................................. C08G 18/80
(52) U.S. Cl. .................... 528/45; 524/376; 525/403; 525/528
(58) Field of Search .................. 524/376; 528/45; 525/403, 528

(56) References Cited

U.S. PATENT DOCUMENTS

| | | | |
|---|---|---|---|
| 4,435,559 A | | 3/1984 | Valko |
| 4,484,994 A | | 11/1984 | Jacobs, III et al. |
| 4,528,363 A | | 7/1985 | Tominaga |
| 4,615,779 A | | 10/1986 | McCollum et al. |
| 4,720,569 A | | 1/1988 | Tominaga |
| 4,820,830 A | * | 4/1989 | Blank .......................... 560/158 |
| 5,202,383 A | | 4/1993 | Moriarity et al. |
| 5,250,164 A | | 10/1993 | Valko |
| 5,594,049 A | | 1/1997 | Yamada et al. |
| 6,110,341 A | | 8/2000 | McMurdie et al. |
| 6,372,108 B1 | | 4/2002 | Hoenig et al. |
| 6,410,146 B2 | * | 6/2002 | Shirakawa et al. ......... 428/418 |
| 2004/0069637 A1 | * | 4/2004 | Eswarakrishnan et al ... 204/489 |

FOREIGN PATENT DOCUMENTS

WO   WO 03/054048 A1   7/2003

OTHER PUBLICATIONS

"Chemistry and Properties of Blocked Aliphatic Isocyanates," *Cytec* (1/99).
"Jeffsol® Alkylene Carbonates Synthesis of Hydroxyalkyl Urethanes," *Huntsman Technical Bulletin*, pp. 1–3 (2003).
"Product Information Mondur MR Aromatic Polyisocyanate Product Code G172," *Bayer Corporation*, Coatings and Colorants Division (Jun. 30, 2002).
"Product Information PAPI 94 Polymeric MDI," *Dow Plastics*, pp. 1–4, (Aug. 2001).
"Polyurethanes North America Products," [online] The Dow Chemical Company, [retrieved on Nov. 26, 2003]. Retrieved from the Internet: <URL: http://www.dow.com/polyurethane/na/product/iso/polymeric.htm.
Wicks, Douglas A. et al., "Review Blocked isocyanates III Part B: Uses and applications of blocked isocyanates", *Elsevier Progress in Organic Coating*, pp. 1–83 (2001).

* cited by examiner

*Primary Examiner*—Rachel Gorr

(57) ABSTRACT

A low viscosity blocked isocyanate solution can be made by reacting together a polymeric isocyanato compound and propylene glycol, or a polymeric primary or secondary amine and propyl carbonate. The resulting beta-hydroxypropyl urethane polymer can be combined with propylene glycol monomethyl ether as a reducing solvent to form a pourable high-solids solution with good flow properties at room temperature. The solution has lower viscosity than is obtained using ethylene glycol as a blocking agent or using several non-HAPS reducing solvents that are similar to propylene glycol monomethyl ether. The solution can readily be combined with electrodepositable paint ingredients to form a curable coating composition.

8 Claims, No Drawings

BLOCKED ISOCYANATE CROSSLINKER SOLUTION

This invention relates to curable compositions and their manufacture and use.

BACKGROUND

Coating compositions based on a mixture of an active hydrogen-containing material, a beta-hydroxy urethane and a cure catalyst have been employed for priming and painting vehicles and other substrates. The beta-hydroxy urethane typically is prepared by reacting an isocyanato compound with a 1,2-polyol, or by reacting a primary or secondary amine with a carbonate. These reactions can produce a so-called "blocked isocyanate" in which the isocyanate groups are replaced by pendant hydroxyalkyl groups. The blocked isocyanate is stable if properly handled and stored (typically even in the presence of an active hydrogen-containing material). On heating the hydroxyalkyl groups will unblock to liberate the isocyanate groups which can then react with the active hydrogen-containing material.

Unfortunately some blocked isocyanates have been formulated in solvents that are now regarded as Hazardous Air Pollutants ("HAPs"). This limits the use of such blocked isocyanates and may necessitate their reformulation.

SUMMARY OF THE INVENTION

The blocked isocyanate in such coating compositions desirably has a low viscosity at room temperature so that it can readily be mixed with the active hydrogen-containing material and other coating composition ingredients. Suitably low viscosity can sometimes be obtained by forming the blocked isocyanate in an appropriate non-reactive (non active hydrogen-containing) solvent, or by letting down the blocked isocyanate after its formation by adding an appropriate reactive or non-reactive solvent. However, the choice of suitable solvents has become more limited owing to the need to use a non-HAPs formulation.

Polymeric isocyanates can provide especially desirable blocked isocyanates for a variety of reasons including their low volatility and increased handling safety. Unfortunately it can be difficult to obtain low viscosity solutions of blocked polymeric isocyanates.

The present invention provides, in one aspect, a method for preparing a blocked isocyanate solution comprising:
a) reacting together a polymeric isocyanato compound and propylene glycol, or a polymeric primary or secondary amine and propyl carbonate, to provide a beta-hydroxypropyl urethane polymer; and
b) combining the beta-hydroxypropyl urethane polymer with propylene glycol monomethyl ether to provide a pourable blocked polymeric isocyanate solution.

In another aspect, the invention provides a blocked polymeric isocyanate solution comprising a pourable mixture of beta-hydroxypropyl urethane polymer and propylene glycol monomethyl ether.

The isocyanate solution employs a non-HAPs solvent, has low room temperature viscosity and can readily be mixed at relatively high solids levels with an active hydrogen-containing material, stripped of solvent and dispersed in water to form a water-based coating composition that can cure at low temperature, e.g., below about 175° C.

These and other aspects of the invention will be apparent from the detailed description below. The above summary should not be construed as a limitation on the claimed subject matter, which subject matter is defined solely by the attached claims, as they may be amended during prosecution.

DETAILED DESCRIPTION

The terms "polymer" and "polymeric" refer to homopolymers and copolymers, as well as to homopolymers or copolymers that may be formed in a miscible blend, e.g., by coextrusion or by reaction, including, e.g., transesterification. The term "copolymer" includes alternating, random and block copolymers.

The term "high solids level" refers to a solution containing more than 50% solids by weight.

The term "pourable" refers to a high solids level liquid solution that if placed in the bottom half of a 240 ml glass jar, cooled if need be to room temperature (25° C.) and allowed to stand for three days at room temperature will, when the jar is inverted flow to the other end of the jar in less than one minute.

The term "dispersion" refers to solutions and to colloidal suspensions.

A variety of polymeric isocyanato compounds can be employed in the invention. The isocyanato compound can be aliphatic, cycloaliphatic or aromatic, with aromatic isocyanato compounds being preferred. Representative examples include but are not limited to diphenylmethane diisocyanate (MDI) polymers such as MONDUR™ MR, MONDUR MRS, MONDUR 582 and other grades of MONDUR polymeric isocyanates commercially available from Bayer Corporation, and the PAPI™ 27, PAPI 94, PAPI 95, PAPI 901 and other grades of PAPI polymeric isocyanates commercially available from Dow Chemical Co.; toluene diisocyanate (TDI) polymers such as toluene diisocyanate dimers and trimers; and isocyanate-terminated prepolymers formed by reacting a polyol, polyether polyol or polyester polyol with a stoichiometric excess of one or more polyisocyanates. Suitable polyols for preparing such prepolymers include those listed in U.S. Pat. No. 4,435,559, the disclosure of which is incorporated by reference.

The beta-hydroxypropyl urethane polymer can be formed by reacting the polymeric isocyanato compound with a stoichiometric excess of hydroxyl groups to available isocyanate groups. The equivalent ratio of hydroxyl groups in the propylene glycol to available isocyanate groups in the isocyanato compound can be for example 2 to 1 or less and more preferably is about 1.5 to 1. The reaction mixture can optionally include blocking agents that may require higher deblocking temperatures than exhibited when propylene glycol alone is used as the blocking agent. Suitable such other blocking agents include aliphatic, cycloaliphatic or aromatic alkyl monoalcohols such as methyl, ethyl, chloroethyl, propyl, butyl, amyl, hexyl, heptyl, octyl, nonyl, 3,3,5-trimethylhexyl, decyl and lauryl alcohols and the like; cycloaliphatic alcohols such as cyclopentanol and cyclohexanol; and aromatic alcohols such as phenyl carbinol. Usually the equivalent amount of hydroxyl groups in such other blocking agent is not more than twice the equivalent amount of hydroxyl groups in the propylene glycol.

The reaction of the polymeric isocyanato compound, propylene glycol and optional other blocking agent typically is carried out in the presence of a suitable urethane formation catalyst. Preferred urethane formation catalysts include metal salts or complexes such as dibutyltin dilaurate, stannous octoate, lead acetate and the like. The urethane formation reaction preferably is carried out in the presence of a suitable non-reactive solvent. Representative non-reactive solvents include ketones such as 2-butanone, 2-pentanone and methyl isobutyl ketone and esters such as butyl acetate. Preferably the polymeric isocyanato compound is added slowly to a heated solution of the propylene glycol, urethane formation catalyst and optional other blocking agent. Representative reaction temperatures are about 50 to about 120° C., with temperatures below about 80° C. being preferred.

The beta-hydroxypropyl urethane polymer can also be formed by reacting a polymeric primary or secondary amine and propyl carbonate. A variety of polymeric primary and secondary amines (including imines) can be employed, including aliphatic, cycloaliphatic or aromatic amines. Aromatic amines typically will be preferred. Representative amines include but are not limited to ethylenediamine (EDA), diethylenetriamine (DETA), triethylenetetramine (TETA), tetraethylenepentamine (TEPA), aminoethylpiperazine (AEP) and aminoethylethanolamine (AEEA), all commercially available from Huntsman LLC. A suitable propyl carbonate is JEFFSOL™ propylene carbonate, also commercially available from Huntsman LLC. Suitable reaction conditions are described in the Huntsman Technical Bulletin entitled "JEFFSOL™ ALKYLENE CARBONATES SYNTHESIS OF HYDROXYALKYL URETHANES", available at http://www.huntsman.com/performance_chemicals/Media/JEFFSOL_Alkylene_Carbonates_Synthesis_of_Hydroxy_Alkyl_Urethanes.pdf, the disclosure of which is incorporated by reference.

The beta-hydroxypropyl urethane polymer is "let down" or "reduced" to form the beta-hydroxypropyl urethane solution by combining the polymer with propylene glycol monomethyl ether. Propylene glycol monomethyl ether can be referred to in this context as the "reducing solvent". Propylene glycol monomethyl ether is a non-HAPS solvent, and appears to provide a lower viscosity urethane polymer solution than several reducing solvents having a similar structure. Propylene glycol monomethyl ether also appears to provide a lower viscosity urethane polymer solution than the dissimilar non-HAPS solvent 2-butanone, also known as methyl propyl ketone. Sufficient propylene glycol monomethyl ether should be employed to provide a high solids solution having sufficiently low room temperature viscosity so that it is pourable and thus can readily be mixed with an active hydrogen-containing material. Preferably the solution contains about 50 to about 75 weight percent solids. The resulting beta-hydroxypropyl urethane solution can be stripped of reducing solvent and dispersed in water to form a water-based coating composition that can cure at low temperatures, e.g., below about 175° C.

A variety of active hydrogen-containing materials can be employed in the coating composition. Preferred active hydrogen-containing materials are film-forming compositions containing an active hydrogen group such as a hydroxyl, primary anine, secondary amine or thiol group and the like. Illustrative examples include epoxy polymers, acrylic polymers, polyesters and the like. Particularly preferred active hydrogen-containing materials are prepared from monomeric or polymeric epoxy compounds or mixtures of compounds having an average of one or more epoxy groups per molecule. Although monoepoxides can be utilized, it is preferred that the epoxy material is a polyepoxide containing more than one epoxy group per molecule. Polyglycidyl ethers of polyphenols such as bisphenol A are especially preferred. These and other suitable active hydrogen-containing materials will be familiar to those skilled in the art and are described in a variety of patents including the above-mentioned U.S. Pat. No. 4,435,559.

An aqueous dispersion of the active hydrogen group-containing material can be prepared by incorporating a suitable water-solubilizing group in the active hydrogen group-containing material. Preferably, the water-solubilizing group is a cationic group such as an amine salt or an onium group such as a quaternary ammonium group. The amine salts, for example, can be prepared by reacting the active hydrogen group-containing material with a primary or secondary amine, followed by neutralizing the resulting amine adduct with an acid. A preformed primary, secondary or tertiary amine acid salt of the amine can also be reacted with the epoxy polymer. The resulting water-based coating composition dispersions usually also contain a suitable cure catalyst. Representative cure catalysts include metal complexes such as lead, zinc, iron, tin and manganese and metal salts such as acetonates (e.g., acetyl acetonate), octoates and naphthanates. The cure catalyst preferably is employed in an amount sufficient to effect cure at a relatively low curing temperature. For example, metal salts or complexes usually are employed in amounts of about 0.1 to 2.0, preferably 0.2 to 1 percent metal by weight based on the curable composition solids weight. The cure catalyst can be mixed simultaneously with the other coating composition ingredients or introduced into the coating composition in any other convenient order. The resulting aqueous dispersions are particularly suited to application by electrodeposition, although they may be applied by non-electrophoretic coating techniques if desired. The coating composition ingredients can also be employed in a solvent-based composition if desired.

Typically the coating composition will contain one or more pigments and, if desired, various additives known in the electrodeposition art such as anti-oxidants, surface-active agents, coupling solvents and the like. Suitable pigments include, for example, carbon black, titanium dioxide, talc, barium sulfate, cadmium yellow, cadmium red, chromic yellow, iron oxides, lead oxides, strontium chromate, and the like. The amounts and types of such ingredients will be familiar to those skilled in the art.

Electrodeposition of the coating composition can be carried out using techniques that will be familiar to those skilled in the art. Typically the aqueous coating composition dispersion is placed in contact with an electrically conductive anode and electrically conductive cathode, with the surface to be coated being the cathode. A variety of electrically conductive cathodes may be employed, especially metals such as steel, aluminum, copper and the like. Upon passage of electric current between the anode and the cathode while in contact with a bath containing the coating composition, an adherent film of the coating composition will be deposited on the cathode. The applied voltage may be varied greatly and can be, for example, as low as one volt or as high as several thousand volts, although typically the voltage will be between about 50 volts and about 500 volts. The current density is usually between about 0.1 ampere and about 2 amperes per square meter, and tends to decrease during electrodeposition. After deposition, the coating is typically cured at elevated temperatures by any convenient method such as baking in an oven or heating using a bank of infrared heat lamps.

The coatings of the invention can be used for a variety of applications. Representative applications include but are not limited to appliance coatings, architectural coatings and vehicular coatings.

The invention will now be described with reference to the following non-limiting examples, in which all part and percentages are by weight unless otherwise indicated.

EXAMPLE 1

999.28 Parts propylene glycol and 434.85 parts 2-pentanone were added to a mixing vessel equipped with a condenser, nitrogen blanket, agitator, and addition funnel. The contents were heated to about 52° C., followed by addition of 1450.97 parts MONDUR MR polymeric isocyanate while keeping the exotherm below 75° C. The addition funnel was next rinsed with 154.87 parts 2-pentanone. The reaction mixture was held at 75° C. for one to two hours until the isocyanate was consumed (thereby forming a beta-hydroxypropyl urethane polymer), then cooled to 60° C. while adding 759.92 parts propylene glycol monomethyl ether (thereby forming a beta-hydroxypropyl urethane solution). The resulting blocked polymeric isocyanate solution was mixed for 30 minutes and stored in a plastic storage vessel.

A waterborne curable epoxy dispersion was formed by combining 435 parts of the blocked polymeric isocyanate solution with 725 parts of a 60/o solution of a conventional cationic epoxy in propylene glycol monomethyl ether reducing solvent and 87 parts of T-DET DD-7 surfactant (commercially available from Harcross Chemicals) in a vessel equipped for vacuum stripping. The mixture was heated to 100° C., thereby removing about 441 parts or about 95% of the reducing solvent. 41.8 Parts of a 50% solution of formic acid were added over a 5 to 15 minute period followed by holding the mixture at 95 to 100° C. for 30 minutes. Water was then added in three portions, with 409.6 parts water being added first over about a 20 minute period, followed by cooling to about 90° C. The mixture was held at about 90° C. for about one to three hours, followed by addition of 819.2 parts water over about 40 minutes while keeping the mixture at about 90° C. A third and final water addition was made by adding 409.6 parts water over about 20 minutes while cooling the mixture to 70° C. The mixture was held at 70° C. for about one to one and one-half hours, then cooled to room temperature to form a curable coating composition.

The curable coating composition was blended with a conventional black cationic pigment paste and a conventional catalyst paste containing dibutyl tin dioxide to create an electrocoating bath containing 20 solids, a 0.1:1 pigment/binder ratio and a 3% catalyst level based on resin solids. The bath was used to electrocoat B952/P60 cold rolled steel panels available from ACT Laboratories, Hillsdale, Mich. at a film thickness of 0.9 to 1.14 mm producing smooth films when cured at 150, 163 and 177° C. All were sufficiently cured to resist more than 100 double rubs using a wipe saturated with methyl ethyl ketone.

EXAMPLE 2

434.85 Parts 2-butanone and 999.28 parts propylene glycol were charged to a mixing vessel equipped with a condenser, nitrogen blanket, agitator, and addition fuel and heated to 52° C. 1450.96 Parts MONDUR MR polymeric isocyanate were charged to the flask (thereby providing a 1.206:1 primary hydroxyl group:isocyanato group equivalent ratio) over a one to two hour period while cooling the mixture as needed to maintain the reaction temperature at 65 to 75° C. Following rinsing of the addition funnel with 154.87 parts of 2-butanone, the reaction mixture was held at 70° C. for 2 hours, then cooled to 60° C. A portion of the reaction mixture was poured into a 240 ml glass jar and cooled to room temperature. This portion contained approximately 75% solids and was not pourable when the jar was inverted. The remaining reaction mixture was divided into four portions, combined in 240 ml glass jars with four different solvents to provide four 64% theoretical solids blocked polymeric isocyanate crosslinking solutions and evaluated as follows:

TABLE 1

| Ingredient | Amount, parts | | | |
|---|---|---|---|---|
| Crosslinker Solution, 75% solids | 119 | 138.76 | 109.07 | 112.46 |
| Propylene glycol monomethyl ether | 20.51 | | | |
| Propylene glycol monobutyl ether | | 24.03 | | |
| Propylene glycol monopropyl ether | | | 18.87 | |
| 2-Butanone | | | | 19.6 |
| Theoretical % Solids | 63.97 | 63.93 | 63.94 | 63.87 |
| Pourability (3 days at room temperature) | Pourable | Not Pourable (Solid) | Not Pourable (Solid) | Not Pourable (Solid) |

As shown in Table 1, propylene glycol monomethyl ether was effective as a reducing solvent at room temperature, but the other three solvents were not.

EXAMPLE 3

Using the general method of Example 2, 230.04 parts 2-butanone and 431.25 parts ethylene glycol were charged to the mixing vessel and heated to 52° C. 767.58 Parts MONDUR MR polymeric isocyanate were charged to the flask (thereby providing a 2.412:1 primary hydroxyl group:isocyanato group equivalent ratio) over a one to two hour period while cooling the mixture as needed to maintain the reaction temperature at 65 to 75° C. Following rinsing of the addition funnel with 71.13 parts of 2-butanone, the reaction mixture was held at 70° C. for 2 hours, then cooled to 60° C. A portion of the reaction mixture was poured into a 240 ml glass jar and cooled to room temperature. This portion contained approximately 75% solids and was not pourable when the jar was inverted. The remaining reaction mixture was divided into four portions, combined in 240 ml glass jars with four different solvents to provide four 60% theoretical solids blocked polymeric isocyanate crosslinking solutions and evaluated as follows:

TABLE 2

| Ingredient | Amount, parts | | | |
|---|---|---|---|---|
| Crosslinker Solution, 75% solids | 105.42 | 105.18 | 120.17 | 118.37 |
| Propylene glycol monomethyl ether | 26.42 | | | |
| Propylene glycol monobutyl ether | | 26.3 | | |
| Propylene glycol monopropyl ether | | | 30.02 | |
| 2-Butanone | | | | 29.57 |
| Theoretical % Solids | 59.97 | 60.00 | 60.01 | 60.01 |
| Pourability | Not Pourable (Solid) | Not Pourable (Solid) | Not Pourable (Solid) | Not Pourable (Solid) |

As shown in Table 2, when ethylene glycol was used as the blocking agent, none of the four reducing solvents evaluated in Table 1 provided a room temperature-pourable blocked polymeric isocyanate solution.

Various modifications and alterations of this invention will be apparent to those skilled in the art without departing from this invention. This invention should not be restricted to that which has been set forth herein only for illustrative purposes.

We claim:

1. A method for preparing a blocked isocyanate solution comprising:

a) reacting together a polymeric isocyanato compound and propylene glycol, or a polymeric primary or secondary amine and propyl carbonate, to provide a beta-hydroxypropyl urethane polymer; and b) combining the beta-hydroxypropyl urethane polymer with propylene glycol monomethyl ether to provide a pourable blocked polymeric isocyanate solution.

2. A method according to claim 1 wherein the isocyanato compound comprises a diphenylmethane diisocyanate polymer.

3. A method according to claim 1 wherein the isocyanato compound comprises an isocyanate-terminated prepolymer formed by reacting a polyol, polyether polyol or polyester polyol with a stoichiometric excess of one or more polyisocyanates.

4. A blocked polymeric isocyanate solution comprising a pourable mixture of beta-hydroxypropyl urethane polymer and propylene glycol monomethyl ether.

5. A solution according to claim 4 wherein the isocyanato compound comprises a diphenylmethane diisocyanate polymer.

6. A solution according to claim 4 containing about 50 to about 75 weight percent solids.

7. A waterborne coating composition comprising an isocyanate solution according to claim 4, an active hydrogen-containing material and a cure catalyst, wherein the composition when stripped of propylene glycol monomethyl ether and applied to a substrate will form a film that upon drying will cure at a temperature below about 175° C.

8. A waterborne coating composition according to claim 7 wherein the active hydrogen-containing material comprises a water dispersible polyepoxide.

* * * * *